(12) United States Patent
Chen et al.

(10) Patent No.: US 11,902,539 B2
(45) Date of Patent: Feb. 13, 2024

(54) METHOD, DEVICE, AND COMPUTER PROGRAM PRODUCT FOR VIDEO COMPRESSION

(71) Applicant: Dell Products L.P., Round Rock, TX (US)

(72) Inventors: Tianxiang Chen, Shanghai (CN); Sanping Li, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/853,262

(22) Filed: Jun. 29, 2022

(65) Prior Publication Data

US 2023/0396778 A1    Dec. 7, 2023

(30) Foreign Application Priority Data

Jun. 6, 2022  (CN) .......................... 202210633520.0

(51) Int. Cl.
| | |
|---|---|
| *H04N 19/167* | (2014.01) |
| *H04N 19/119* | (2014.01) |
| *G06T 7/174* | (2017.01) |
| *G06T 7/194* | (2017.01) |
| *G06V 20/40* | (2022.01) |

(52) U.S. Cl.
CPC .......... *H04N 19/167* (2014.11); *G06T 7/174* (2017.01); *G06T 7/194* (2017.01); *G06V 20/41* (2022.01); *H04N 19/119* (2014.11); *G06T 2207/10016* (2013.01)

(58) Field of Classification Search
CPC .... H04N 19/167; H04N 19/119; G06T 7/174; G06T 7/194; G06T 2207/10016; G06V 20/41

USPC ..................................................... 375/240.08
See application file for complete search history.

(56) References Cited

U.S. PATENT DOCUMENTS

| | | | | |
|---|---|---|---|---|
| 2009/0161766 | A1* | 6/2009 | Bronstein | ............ H04N 19/40 375/E7.076 |
| 2010/0128789 | A1* | 5/2010 | Sole | ....................... G06T 7/215 375/240.18 |
| 2021/0390710 | A1* | 12/2021 | Zhang | ................... G06V 10/82 |

OTHER PUBLICATIONS

M. Cavestany et al., "AI Fast-forwards Video for Sport Highlights," https://www.ibm.com/downloads/cas/XKEPLEJD, Apr. 2019, 8 pages.

(Continued)

*Primary Examiner* — Christopher S Kelley
*Assistant Examiner* — Ana Picon-Feliciano
(74) *Attorney, Agent, or Firm* — Ryan, Mason & Lewis, LLP

(57) ABSTRACT

Embodiments of the present disclosure relate to a method, a device, and a computer program product for video compression. The method includes: segmenting, in response to one or more features of an object in a video having a periodic change, the video into a plurality of segments based on a cycle of the periodic change; and identifying focal regions in frames of the video that are associated with the object. The method further includes: compressing the video based on the plurality of segments and the focal regions. This solution provides a content-aware lightweight video compression solution that supports content-based video deduplication at multiple scales and breaks the spatio-temporal continuity constraint of video frames during compression, thus enabling more effective video compression.

20 Claims, 6 Drawing Sheets

(56) References Cited

OTHER PUBLICATIONS

Deepmind, "Kinetics: A Collection of Large-Scale, High-Quality Datasets of URL Links of Video Clips That Cover Human Action Classes," https://deepmind.com/research/open-source/kinetics, Accessed Apr. 21, 2022, 3 pages.

J. Carreira et al., "A Short Note on the Kinetics-700 Human Action Dataset," arXiv:1907.06987v1, Jul. 15, 2019, 6 pages.

D. Dwibedi et al., "RepNet Counting Out Time: Class Agnostic Video Repetition Counting in the Wild," https://sites.google.com/view/repnet, Accessed Apr. 21, 2022, 8 pages.

D. Dwibedi et al., "Counting Out Time: Class Agnostic Video Repetition Counting in the Wild," arXiv:2006.15418v1, Jun. 27, 2020, 15 pages.

U.S. Appl. No. 17/677,126 filed in the name of Tianxiang Chen et al., filed Feb. 22, 2022, and entitled "Video Compression Method, Electronic Device, and Computer Program Product."

\* cited by examiner

# METHOD, DEVICE, AND COMPUTER PROGRAM PRODUCT FOR VIDEO COMPRESSION

RELATED APPLICATION(S)

The present application claims priority to Chinese Patent Application No. 202210633520.0, filed Jun. 6, 2022, and entitled "Method, Device, and Computer Program Product for Video Compression," which is incorporated by reference herein in its entirety.

FIELD

Embodiments of the present disclosure relate to data processing technologies and, more particularly, to a method, a device, and a computer program product for video compression.

BACKGROUND

With the growing popularity of smart devices and social networks, millions of videos are created and shared every day. Many videos contain periodically duplicated processes, such as natural cycles (e.g., moon phases), artificially duplicated processes (e.g., traffic patterns, sports, and human activities), and the like. The creation and sharing of a large number of videos also increase the demands for massive storage space, communication resources, and the like.

SUMMARY

Embodiments of the present disclosure provide a solution for video compression.

In a first aspect of the present disclosure, a method for video compression is provided. The method includes: segmenting, in response to one or more features of an object in a video having a periodic change, the video into a plurality of segments based on a cycle of the periodic change; identifying focal regions in frames of the video that are associated with the object; and compressing the video based on the plurality of segments and the focal regions.

In a second aspect of the present disclosure, an electronic device is provided. The electronic device includes a processor and a memory coupled to the processor, wherein the memory has instructions stored therein which, when executed by the processor, cause the device to perform actions including: segmenting, in response to one or more features of an object in a video having a periodic change, the video into a plurality of segments based on a cycle of the periodic change; identifying focal regions in frames of the video that are associated with the object; and compressing the video based on the plurality of segments and the focal regions.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to execute the method according to the first aspect of the present disclosure.

It should be noted that this Summary is provided to introduce a selection of concepts in a simplified manner, which will be further described in the Detailed Description below. The Summary part is neither intended to identify key features or major features of the present disclosure, nor intended to limit the scope of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent, in which.

Throughout the drawings, the same or similar reference numerals represent the same or similar elements.

DETAILED DESCRIPTION

Figure 1:
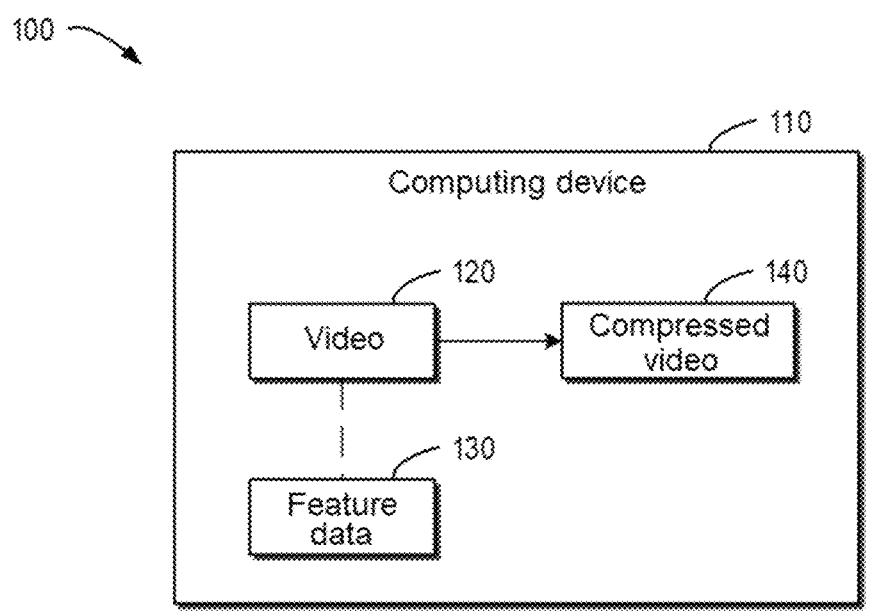
FIG. 1 illustrates an example environment in which a plurality of embodiments of the present disclosure can be implemented.

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

Periodic processes ranging from natural cycles (e.g., moon phases, heartbeats, and breathing) to artificially duplicated processes (e.g., traffic patterns, sports, and human activities) are common in daily life. In order to observe and analyze these processes, it is far from enough to record a few cycles. Generally, people record thousands or even millions of such duplicated cycles in videos. Such video can last for several hours, which takes up large amounts of storage space, and requires substantial communication resources in subsequent transmission.

Video of the type noted above has high periodicity, which means that most of the content in the video is duplicated, and the content may vary only slightly between cycles. Take a video of rowing machine training as an example. An athlete performs similar back-and-forth actions several times in a training session, such as multiple cycles of pulling back arms toward the chest and pushing them outward. Most cycles may be highly similar with slight differences due to the physical or psychological condition of the athlete during training. For ease of illustration, the solution of the present disclosure will be described below in conjunction with a rowing machine training video example, but it should be understood that such a video is intended as an example only and that the present disclosure is also applicable to other videos with periodically duplicated contents.

In order to effectively and efficiently store and transmit a periodic video for further operations such as analysis, it is necessary to delete duplicated contents therefrom to compress the video while retaining anomalous motions that differ from other cycles for future restoration of the original video contents or for performing other operations. A conventional video deduplication method is a hash-based method. This method first converts frames of a video into a series of hash codes using computer vision techniques or machine learning. Then, the hash codes of time series (video clips) of two frames or two sets of frames may be compared to determine whether the series of the two frames or the two sets of frames are duplicated with each other. This method can measure the differences between two videos in terms of subtitles, language (audio), or resolution to remove duplicated data, but is not directly applicable to videos with periodic changes and is too costly. Some other methods use deep learning models to delete duplicated data from a video. For a video that includes periodic changes, such a model trains a machine learning model in an end-to-end manner to directly estimate the cycle of duplications. Deep learning methods require a large amount of computational power (especially from GPUs) and are therefore not suitable for deployment in lightweight scenarios (e.g., at edge devices). Therefore, techniques that are dedicated to a periodic video and are cost-effective are needed to perform deduplication of content in the video, so as to save more costs and compress the video more effectively.

In order to at least partially address the above and other potential problems, embodiments of the present disclosure provide a visual content-aware video deduplication solution to compress a video. This solution identifies in each frame of the video a focal region associated with the content of interest and a background region other than the focal region, thereby supporting deduplication to be performed at a smaller granularity than frames. On this basis, the solution takes into account the periodic characteristic of the video, i.e., it is still likely that there are many duplicated content regions between two frames that are far apart in the time series. Based on the understanding of this characteristic, the solution measures the similarity of focal contents at various scales without being subjected to the spatio-temporal continuity constraint between video frames, and deletes duplicated content frame-by-frame within a cycle, as well as across cycles, based on the similarity of the focal contents, thereby compressing the video more effectively. According to some embodiments of the present disclosure, it is only necessary to perform simple clustering algorithms and numerical calculations using the results of detection of video frames by a deep learning model to run the deduplication process quickly without additional deep learning inference efforts, thus being ideal for deployment in lightweight video applications (e.g., at edge devices). This solution differs from video coding methods such as H.264 and H.265, and does not conflict with such video codecs, but in some embodiments can be used in combination with them to compress videos.

FIG. 1 illustrates a schematic diagram of example environment 100 in which a plurality of embodiments of the present disclosure can be implemented. Environment 100 may include computing device 110. Examples of computing device 110 include, but are not limited to, a personal computer, a smart phone, a tablet, a laptop, and a desktop computer. The scope of the present disclosure is not limited in this regard. In addition, although illustrated as a single device, computing device 110 may also be a plurality of devices, a virtual device, or any other form of devices suitable for implementing embodiments of the present disclosure.

For illustrative purposes, video 120 is also shown in FIG. 1. In embodiments of the present disclosure, video 120 may be any suitable video with periodically changing content that includes one or more objects with periodic changes. As a non-limiting example, video 120 may be a rowing machine training video as previously described. In addition, environment 100 may also include more videos with periodically changing duplicated content and/or other videos. Environment 100 may also include feature data 130 of objects in video 120. Feature data 130 may be stored in association with video files, for example, in a digital or text format.

Computing device 110 may be configured to generate video 120 or acquire it from other devices (not shown), perform a compression operation on video 120, and save the result as compressed video 140. Then, compressed video 140 may be stored by computing device 110 in its own storage apparatus, or transmitted by computing device 110 to other devices. For example, computing device 110 may perform the above processes using the method according to embodiments of the present disclosure and/or using feature data 130, which will be described in more detail below in conjunction with other accompanying drawings.

It should be understood that the structure and functions of environment 100 are described for illustrative purposes only and do not imply any limitation to the scope of the present disclosure. Environment 100 may also include devices, components, and other entities not shown in FIG. 1. Moreover, embodiments of the present disclosure may also be applied in an environment different from environment 100.

Figure 2:
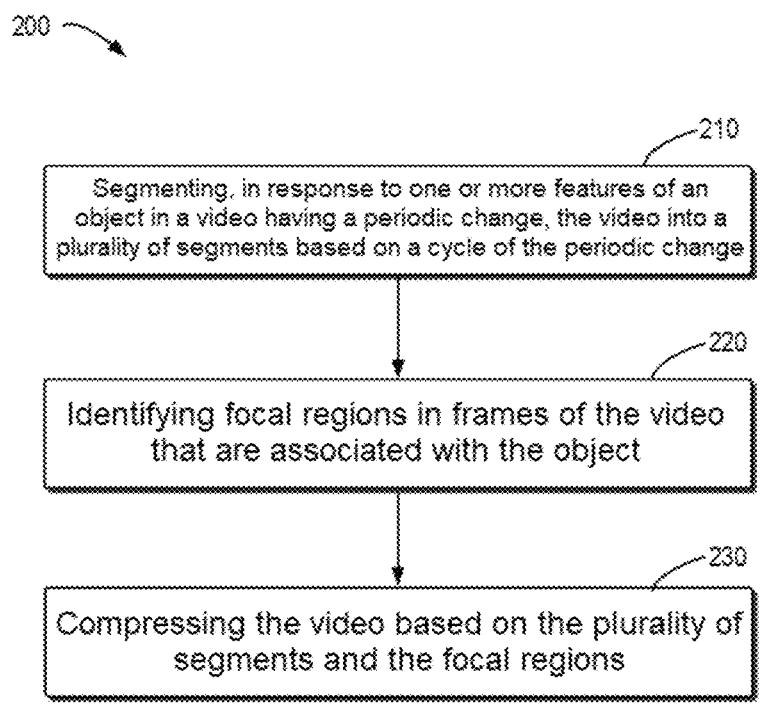
FIG. 2 illustrates a flow chart of an example method for compressing a video according to some embodiments of the present disclosure.

FIG. 2 illustrates a flow chart of example method 200 for compressing a video according to some embodiments of the present disclosure. Method 200 may be executed, for example, by computing device 110 as shown in FIG. 1. It should be understood that method 200 may also include additional actions not shown, and the scope of the present disclosure is not limited in this regard. Method 200 is described in detail below in conjunction with example environment 100 of FIG. 1.

At block 210, in response to one or more features of an object in a video having a periodic change, the video is segmented into a plurality of segments based on a cycle of the periodic change. For example, computing device 110 may segment, in response to one or more features of an object in video 120 having a periodic change, video 120 into a plurality of segments based on a cycle of the periodic change. In other words, due to the periodicity of the content of video 120, there will be some elements in the frames of video 120 that have periodic patterns. Computing device 110 may split video 120 into periodic video clips based on these periodic patterns, wherein each clip includes one cycle of the pattern.

The one or more features depend on the specific content of video 120 and may be extracted using, for example, knowledge in the field of the content or machine learning techniques. For example, for purposes of analyzing an object of interest, computing device 110 or other computing devices may have extracted feature data 130 of the object from frames of the video using, for example, computer vision, speech analysis, and the like. These feature data may be stored in association with the video file, for example, in a digital or text format and may be used by computing device 110 to segment video 120. A rowing machine training video is used as an example of video 120, where the object may be an athlete, and the features may be the athlete's posture points (e.g., elbows, knees, hips, ankles, etc.) that may form a number of geometric angles (e.g., elbow angles, knee angles, hip angles, ankle angles, etc.). As the athlete repeats the action several times during training, the values of these angles change periodically, thus reflecting the periodic changes in the posture points. Computing device 110 may determine, based on the temporal pattern of the change, the range in which the start/end of a cycle may appear (e.g., in the range in which the lowest/highest values of the angles appear), and thereby identify frames corresponding to the start/end of the cycle so as to segment video 120 into segments by cycles.

In block 220, focal regions in frames of the video that are associated with the object are identified. For example, computing device 110 may identify focal regions in frames of video 120 that are associated with the object. The object with a periodic change within frames is a determinant factor of the periodicity of the video. The content region associated with it is typically the focal point of interest to the user of the video. For example, that region is the most valuable for the analysis of the object. Such focal content region may be identified for use in compressing the periodic video in embodiments of the present disclosure. For example, computing device 110 may use deep learning methods to accurately extract the contour of the object (such as the body contour of the athlete in the rowing machine video) in frames of video 120 and use the region covered by the contour as focal regions. In some embodiments, computing device 110 may use a heuristic bounding box method to identify the focal regions. Specifically, by using feature data, computing device 110 may form bounding boxes for multiple portions of the object in frames (e.g., connecting multiple posture points of the athlete into a polygon). Computing device 110 may then combine multiple bounding boxes to obtain a union thereof, wherein the region of the union covers substantially all portions of the object (e.g., the athlete) and is identified as the focal regions of the frames.

Figure 4:
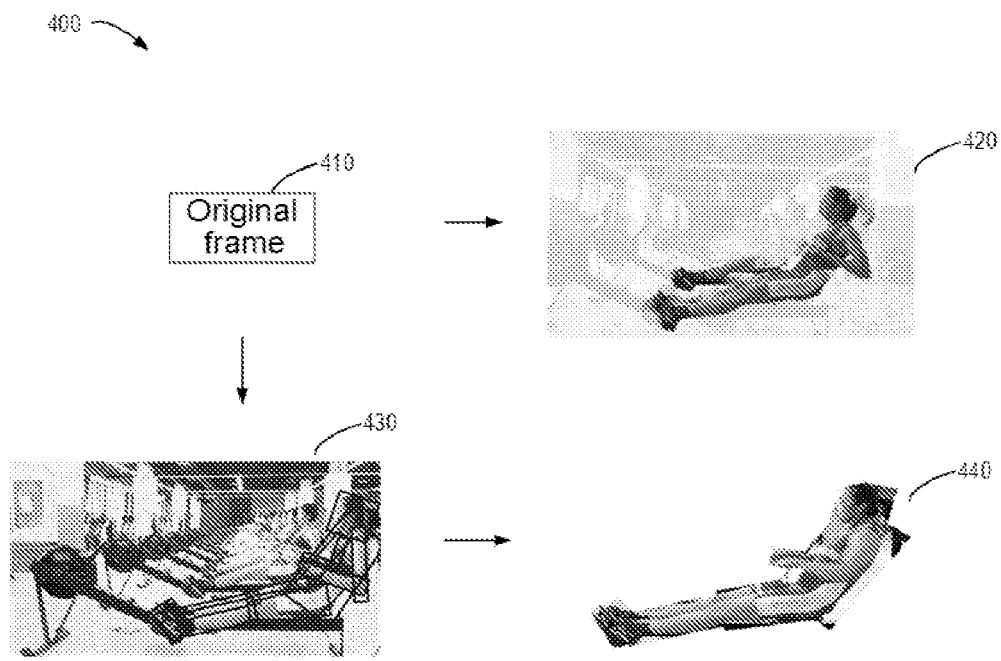
FIG. 4 illustrates an example of identifying a focal region according to some embodiments of the present disclosure.

As an illustration, FIG. 4 shows an example 400 of identifying a focal region according to some embodiments of the present disclosure. In this non-limiting example, the results of identifying focal regions in original frame 410 of rowing machine training using different methods are shown, which are regions associated with the body of the athlete in this example. In FIG. 4, reference numeral 420 illustrates an embodiment of the body contour of the athlete that is extracted using a deep learning method. Reference numeral 430 illustrates bounding boxes for a plurality of portions of the body of the athlete in frame 410, and reference numeral 440 illustrates another embodiment of a focal region extracted using the bounding boxes. Compared with deep learning methods, the heuristic bounding box method can identify the approximate region where the object of interest is located with less computational effort.

Referring again to FIG. 2, at block 230, the video is compressed based on the plurality of segments and the focal regions (obtained at block 210 and block 220). For example, computing device 110 may compress video 120 based on the plurality of segments of video 120 that are segmented by cycles as well as the focal regions of video 120. In some embodiments, computing device 110 may delete focal regions with duplicated content by comparing the similarity of focal regions of frames within a single segment, thereby compressing video 120. In some embodiments, computing device 110 may also delete focal regions with duplicated content by comparing the similarity of focal regions of corresponding frames in a plurality of segments, thereby compressing video 120 to obtain compressed video 140. An example implementation of compressing a video based on a plurality of segments and focal regions will be described in more detail below in conjunction with FIG. 3.

Figure 3:
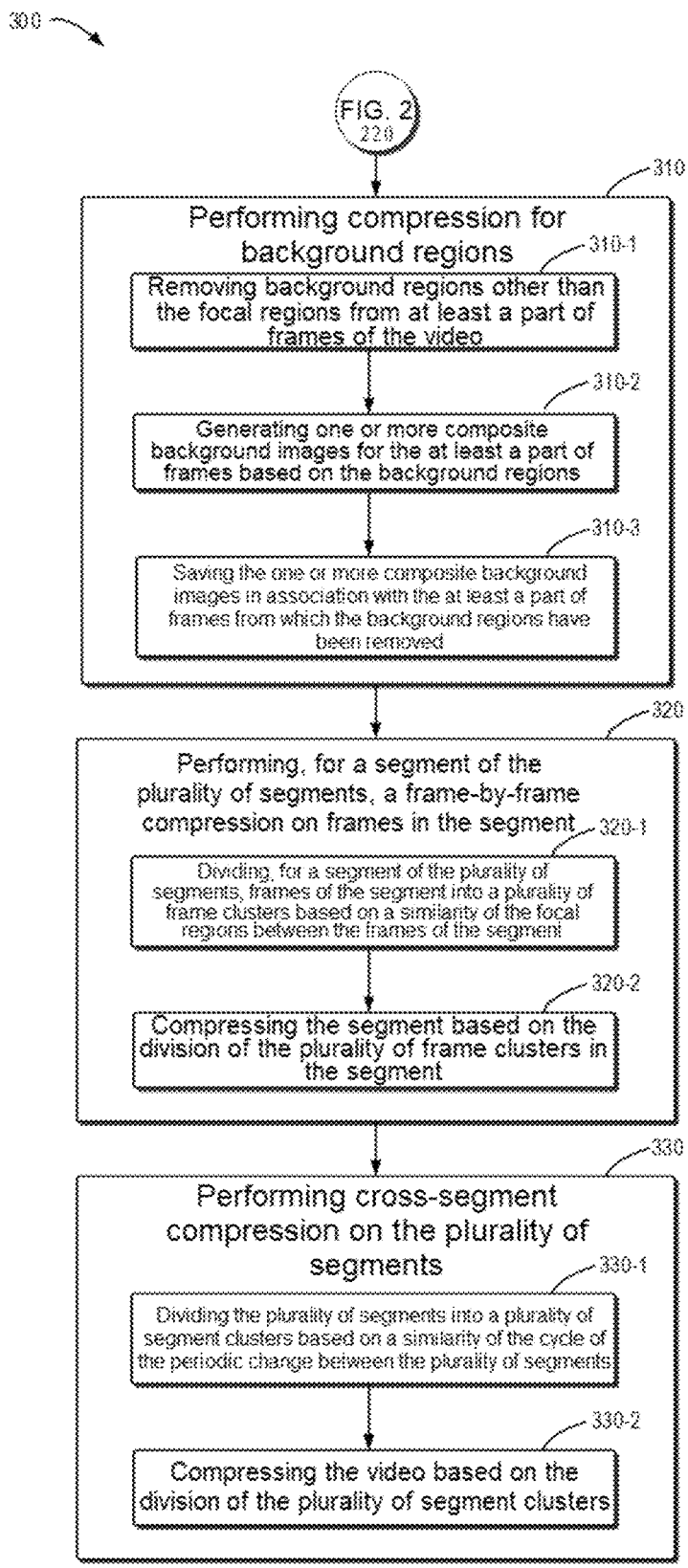
FIG. 3 illustrates a flow chart of an example method for compressing a video based on a plurality of segments and focal regions according to some embodiments of the present disclosure.

FIG. 3 illustrates a flow chart of an example method 300 for compressing a video based on a plurality of segments and focal regions according to some embodiments of the present disclosure, and method 300 may be regarded as an example implementation of block 230 in method 200. It should be understood that although the actions of method 300 are shown in a certain order, the actions of method 300 may also be combined in other appropriate orders unless the context indicates otherwise. In addition, some of the actions of method 300 may be omitted in specific embodiments, the method may also include additional actions not shown, and the scope of the present disclosure is not limited in this regard. Method 300 may be performed, for example, by computing device 110 as shown in FIG. 1. Method 300 is described in detail below in conjunction with example environment 100 of FIG. 1.

Method 300 may be performed after the video has been segmented into a plurality of periodic segments and focal regions of the video have been identified according to method 200.

In some embodiments, the remaining portions of video 120 other than the focal regions are not important for processing and/or analysis purposes of that video. In this case, these regions may be regarded as background regions, and any fluctuations thereof may be regarded as noise and intentionally ignored in video processing and/or analysis. In some such embodiments, computing device 110 may perform deduplication at block 310 for the background regions of video 120 to compress video 120.

At sub-block 310-1, computing device 110 may remove background regions other than the focal regions from at least a part of frames of video 120. Computing device 110 may remove the background regions from some or all of the frames of video 120 based on the focal regions identified at block 220 of method 200. Through this operation, the amount of data in the frames of video 120 is further reduced.

At sub-block 310-2, based on the background regions, computing device 110 may generate one or more composite background images for the at least a part of frames.

In some embodiments, for a segment of the plurality of segments of video 120 that are segmented according to method 200, computing device 110 may generate a composite background image for the segment based on background regions in frames of the segment other than the focal regions. For example, computing device 110 may find the motion trajectory of the object (e.g., the body of the athlete) within the cycle corresponding to the segment by analyzing changes in feature data (e.g., posture points). Here, the background region covered by the focal region in one frame may be revealed in another frame. Computing device 110 may thus combine background regions from different frames to augment the background region, thereby generating a composite background image for the segment throughout the cycle. In this way, only portions that are consistently covered by the focal regions throughout the cycle (e.g., the body parts of the athlete) will be unusable in the background image for the segment. In some other embodiments, computing device 110 may also generate a composite background image for a plurality of segments (e.g., a set of segments or a cluster of a plurality of similar segments), or generate a composite background image for the entire video.

Figure 5:
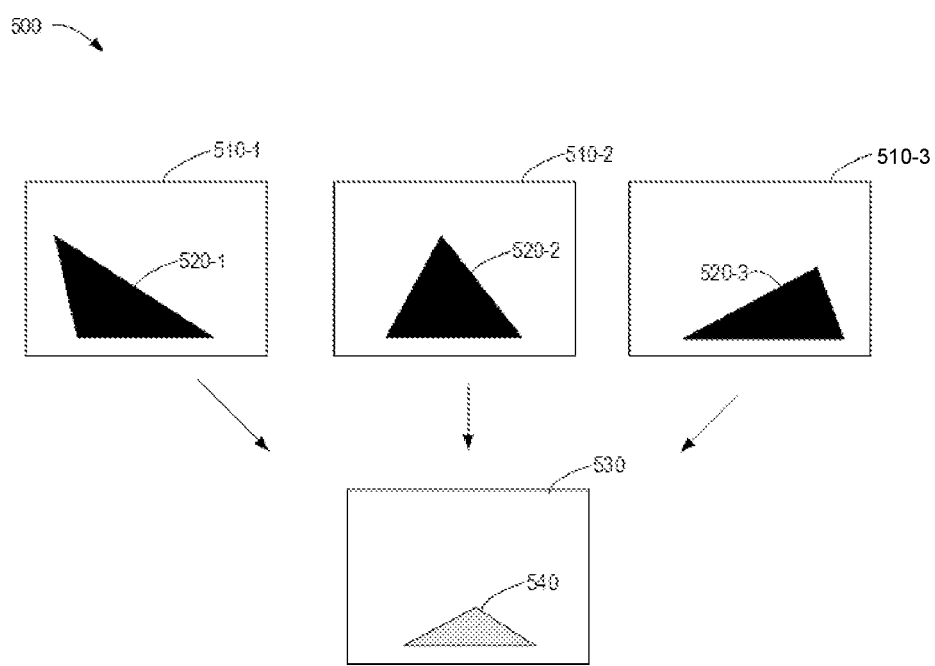
FIG. 5 illustrates a simplified example of generating a composite background image based on a plurality of frames according to an embodiment of the present disclosure.

As an illustration, FIG. 5 shows a simplified example 500 of generating a composite background image based on a plurality of frames of a video. In this non-limiting example, the focal regions in frames 510-1, 510-2, and 510-3 are shown as 520-1, 520-2, and 520-3, respectively. With the changes in the location of the focal regions in the video, a different background region will appear in each frame. The computing device (e.g., computing device 110) may combine the background regions from 520-1, 520-2, and 520-3 to generate composite background image 530. In this way, only region 540 that is obscured by the focal regions in all images is unusable in the background image. It should be understood that although only three frames are shown in FIG. 5 for clarity of illustration, more frames could be used. As more frames are used to generate the background image, the generated background image will become more complete.

At sub-block 310-3, computing device 110 may save one or more composite background images in association with the at least a part of frames from which the background regions have been removed. In the above embodiment where a composite background image is generated for a segment, computing device 110 may retain in compressed video 140 the focal region of each frame as well as a single composite background image associated with each segment. Computing device 110 may store (e.g., in the form of metadata) a mapping between composite background images and a corresponding set of frames (e.g., segments or a cluster of segments) in association with compressed video 140, for use in subsequent operations such as restoration and rendering.

According to block 310, computing device 110 may perform a deduplication operation on the video in units smaller than frames (e.g., a set of pixels), thereby highly condensing frame content, thus reducing requirements for video storage space and computational costs.

At block 320, computing device 110 may perform, for a segment of the plurality of segments of video 120, a frame-by-frame compression operation on frames in the segment.

At sub-block 320-1, computing device 110 may divide, based on the similarity of the focal regions between frames of the segment, the frames of the segment into a plurality of frame clusters (e.g., a predetermined number of frame clusters). In some embodiments, computing device 110 may identify a plurality of phases of the periodic change in video 120 and segment the segment into a plurality of subsegments corresponding to the plurality of phases. This means that, in addition to identifying corresponding key phase frames that indicate the start/end of the cycle, computing device 110 may also analyze the pattern based on knowledge in the field and feature data to find representative indicators that indicate transitions between different phases within the cycle (such as feature value ranges). Computing device 110 may then identify key phase frames within the segment that correspond to these indicators, thereby segmenting the segment into a plurality of subsegments. As a non-limiting example, computing device 110 may find the midpoint of the periodic change, thereby splitting the cycle into two sub-cycles. Computing device 110 may then segment a periodic segment of video 120 into segments corresponding to the two sub-cycles. It should be understood that the number of phases in the cycle and the subsegments in the segment that correspond thereto depend on the specific video content and application, and the scope of the present disclosure is not limited in terms of the specific number of phases and subsegments.

Then, for each subsegment in the plurality of subsegments, computing device 110 may divide, based on the similarity of the focal regions between frames of the subsegment, the frames of the subsegment into a set of frame clusters (e.g., a predetermined number of frame clusters) as a part of the plurality of frame clusters. By clustering each subsegment in the segment separately, computing device 110 may obtain a plurality of frame clusters that are more evenly distributed throughout the different phases of the entire cycle. Taking the rowing machine training video as an example, computing device 110 may segment a video segment by using the moment when the athlete extends the body and pulls the arms back to the chest (e.g., when the angle between knees and hips is maximum while the angle between elbows is minimum) as the start/end of the cycle, and further identify the moment when the athlete curls the body and extends the arms (e.g., when the angle between knees and hips is minimum and the angle between elbows is maximum) as the midpoint of the cycle to segment the segment into two subsegments. The two subsegments are clustered separately, thus avoiding the clustering of frames with similar positions of the body of the athlete in different phases, which can ensure that frames including contents of different phases in the cycle are retained in the compression result.

In some embodiments, as a basis for performing similarity clustering, computing device 110 may calculate a focal content difference value between the focal region of each frame in a segment and the focal region of the key phase frame of the segment (the start/end frame of the periodic segment, and/or other key phase frames for division of subphases). Then, for example, by performing unsupervised learning (e.g., K-Means) on the calculated difference value for each frame, computing device 110 may divide the frames into a plurality of frame clusters. In some such embodiments, computing device 110 may perform the calculation of difference value for the focal region of each frame in the segment and the focal region of the start frame of the segment, and perform clustering of the calculated focal content difference values to divide the frames of the segment into a plurality of clusters. In some embodiments where subsegments are divided, computing device 110 may perform the calculation of difference value for each frame in a subsegment and the key phase frame that serves as the start of that subsegment. For example, for the rowing machine training video example where the focal regions are extracted by bounding boxes, computing device 110 may calculate the difference values between frames based on the geometric information of the bounding box for each body part. In other embodiments, the computing device may also use other appropriate values characterizing the focal regions as the basis for clustering.

Figure 6:
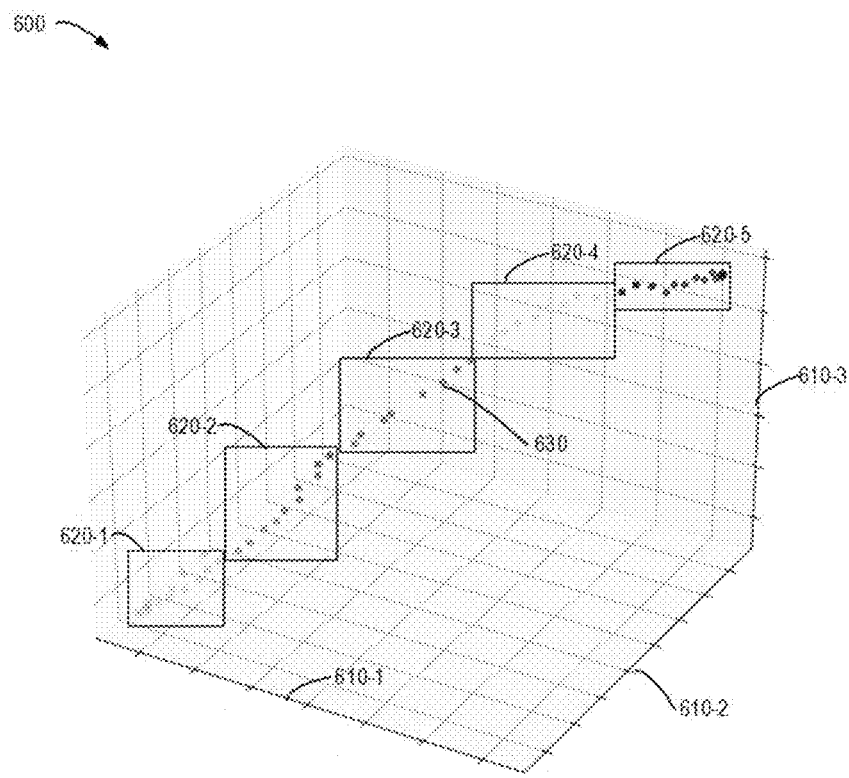
FIG. 6 illustrates an example visualization of frame clusters according to an embodiment of the present disclosure.

As an illustration, FIG. 6 shows an example visualization 600 of frame clusters according to an embodiment of the present disclosure, which illustrates visualization of the result of performing clustering for frames of a subsegment in the rowing machine training video example. The rowing machine training video may be an example of video 120 in FIG. 1, and the clustering operation may be performed by computing device 110. The example visualization 600 will be described below in conjunction with FIG. 1.

In this non-limiting example, computing device 110 divides a segment of video 120 into two subsegments, namely a front subsegment and a back subsegment, and performs clustering operations on the subsegments separately using the method as previously described, so as to obtain a predetermined number of clusters. Visualization 600 illustrates the clustering result for one of the front subsegments in a three-dimensional feature space. Here, coordinate axes 610-1, 610-2, and 610-3 represent features between which the difference values have the highest variances. Each point (e.g., point 630) indicates the position of a frame of the subsegment in this feature space. Blocks 620-1 through 620-5 schematically illustrate the range of frames included in each frame cluster. In this example, each cluster typically contains frames in a sequential temporal order, since most of these frames are similar based on the focal content. Computing device 110 then selects the closest point (frame) to the center of each cluster as the reference frame for similarity comparison for use in subsequent operations. It should be understood that visualization 600 is shown for illustrative purposes only, the numbers of frames, frame clusters, and features therein are used as examples only, and in other embodiments, any other appropriate numbers of frames, frame clusters, and features may also be used.

Returning now to FIG. 3, at sub-block 320-2, for a segment in the plurality of segments, computing device 110 may compress this segment based on the division of a plurality of frame clusters in the segment at sub-block 320-1. In some embodiments, for a frame cluster in the plurality of frame clusters, computing device 110 may determine a central frame of this frame cluster, wherein the central frame is a frame in the frame cluster that is the closest to the center of the frame cluster. For example, computing device 110 may perform calculations by projecting the focal content difference values of the frames into the corresponding feature space. Computing device 110 may then compare other frames in the frame cluster with the central frame and, in response to the similarity of the focal regions between the central frame and another frame in the frame cluster satisfying a threshold, remove that another frame from that segment. Computing device 110 may compare the similarity in a manner similar to that described previously and treat the focal regions of two frames whose similarity is less than a threshold as contents duplicated with each other. The threshold may depend on specific applications, and the scope of the present disclosure is not limited in this regard. Through this operation, computing device 110 can retain in each frame cluster only the focal content regions of the central frame and frames different from the central frame, thereby reducing the amount of data of the video while maximizing the retention of useful content.

Compared with sampling at a time interval within a segment or subsegment considering only the time factor, the selection of comparison reference frames based on similarity clustering takes into account the content of the video. Frames selected in this way can represent different contents within a subsegment to the greatest extent, which in turn improves the efficiency of deduplication and the comprehensiveness of its result, thus reaching better video compression effects.

In some embodiments, after performing frame-by-frame deduplication for frames within a segment, computing device 110 may also perform segment-by-segment deduplication for a plurality of segments at block 330.

At sub-block 330-1, computing device 110 may also divide, based on the similarity of cycles of the periodic changes across a plurality of segments, the plurality of segments of video 120 into a plurality of segment clusters (e.g., a predetermined number of clusters). Taking the rowing machine training video as an example, there are fluctuations in the athletes' performance quality in different cycles. Compared with cycles of different qualities, the change trend of the action has a higher similarity between cycles of similar qualities, and segments corresponding to these cycles are more likely to have contents duplicated with each other. Therefore, grouping segments corresponding to cycles of similar qualities into the same cluster for processing can be beneficial for compression.

As with the similarity between frames, computing device 110 may integrate feature metric values that quantitatively describe the focal regions of frames in each segment as a basis for calculating the similarity between segments. In some embodiments, computing device 110 may calculate the similarity based on a content difference value vector for a frame in a segment relative to a key phase frame. For example, for each segment, computing device 110 may compare the similarity between the content difference value vector of that segment and the content difference value of the current central segment of each of existing clusters and group that segment into the corresponding cluster if the highest similarity therein satisfies a (e.g., predefined) threshold. Otherwise, that segment will form a new cluster. In some other embodiments, depending on the video content and specific applications, computing device 110 may also use other quantitative representations of the video segments as the basis for similarity clustering.

At block 330-2, computing device 110 may also compress video 120 based on the division of the plurality of segment clusters. In some embodiments, the computing device may determine a central segment of a segment cluster of the plurality of segment clusters, wherein the central segment is a first segment in the segment cluster that is the closest to the center of that segment cluster. Similar to a central segment of a frame cluster, computing device 110 may use the Euclidean distance between the representations of focal regions of segments in a cluster to find and/or mark the central segment. Then, for a second segment in the segment cluster, computing device 110 may compare a frame of the second segment to a corresponding frame of the central segment. Based on the similarity of focal regions between that frame and a corresponding frame of the central segment satisfying a threshold, computing device 110 may remove that frame of the second segment from the second segment. In some such embodiments, computing device 110 may chronologically sort segments in the segment cluster other than the central segment and perform the above comparison and deduplication operations on these segments in sequence. In some such embodiments, computing device 110 may also generate and retain only one composite background image for each segment cluster in the manner described above with respect to sub-block 310-3.

Figure 7:
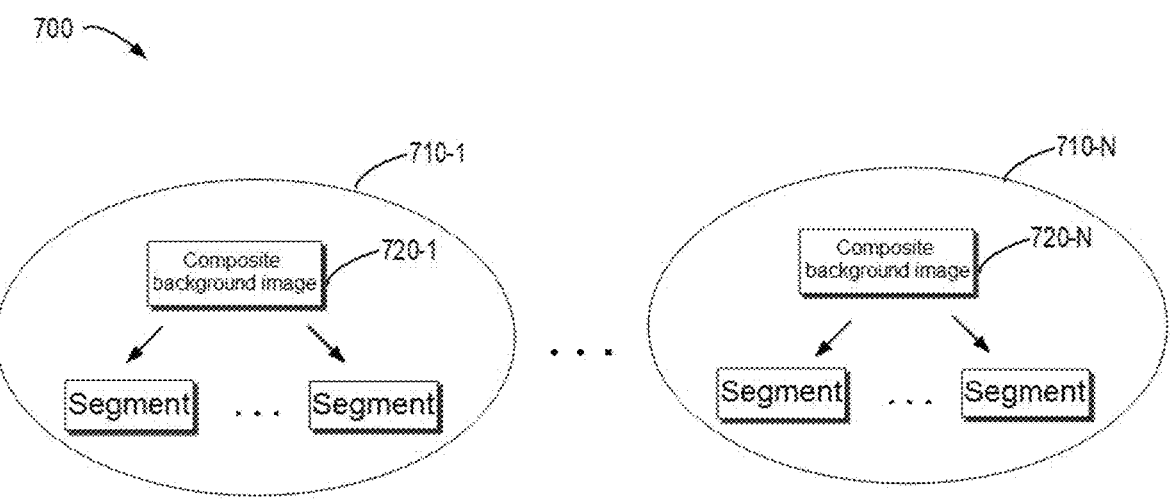
FIG. 7 illustrates an example diagram of segment clusters according to some embodiments of the present disclosure.

As an illustration, FIG. 7 shows example diagram 700 of segment clusters of video 120 according to some embodiments of the present disclosure. In this non-limiting example, video 120 is divided into segment clusters 710-1 through 710-N based on a focal content region difference value vector (as previously described) for the segments of video 120. For each cluster, only one composite background image is generated in this example and will be retained in the compression result (e.g., compressed video 140), for example, composite background image 720-1 for segment cluster 710-1 and composite background image 720-N for segment cluster 710-N.

By means of the above content-aware comparison between corresponding frames in segments across cycles, the temporal continuity between video frames can be broken and content deduplication across time scales can be achieved based on the focal contents in video frames of different segments.

Based on method 200, method 300 can provide deduplication logic at different granularity levels to obtain better video compression results. For example, the computing device (e.g., computing device 110) that performs video compression may first perform a frame-by-frame visual content deduplication process for the focal regions and background regions of each periodic segment of the video and then cluster the segments, and further remove duplicated content from each segment cluster using the video frames in the central segment of that segment as the content basis. In addition, metadata of the duplicated content and the mapping relationship may be saved along with the compression result, for example, in the form of coordinates, for use in subsequent video content restoration and the like. In this process, all intermediate calculation results may be stored in the plain text format and thus will not occupy much memory space. Moreover, all computation operations are numerical calculations and classical statistical machine learning techniques that do not require high resource consumption or powerful hardware support.

Figure 8:
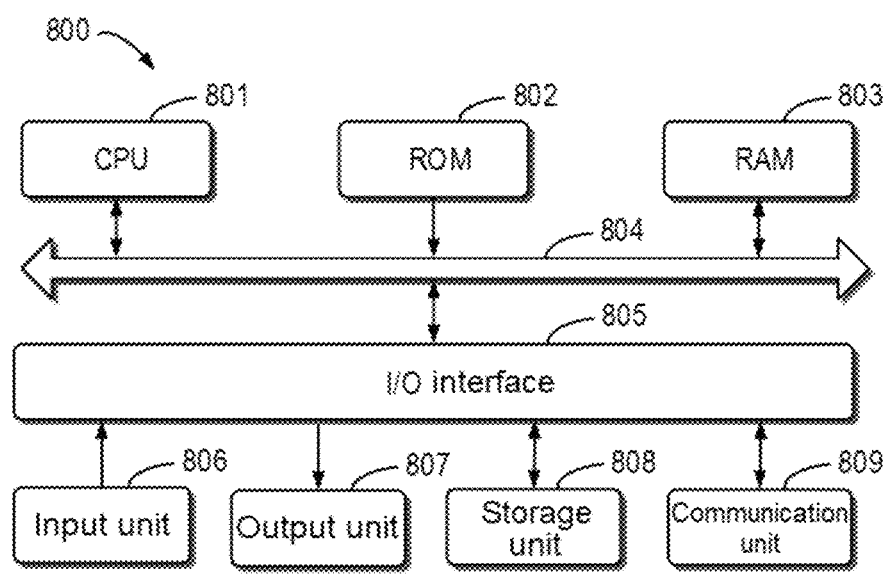
FIG. 8 illustrates a schematic block diagram of a device that can be used to implement embodiments of the present disclosure.

FIG. 8 illustrates a schematic block diagram of device 800 that may be used to implement embodiments of the present disclosure. Device 800 may be the device or apparatus described in embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus 804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by CPU 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local region network, a wide region network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A video compression method, comprising:
    segmenting, in response to one or more features of an object in a video having a periodic change, the video into a plurality of segments based on a cycle of the periodic change;
    identifying focal regions in frames of the video that are associated with the object; and
    compressing the video based on the plurality of segments and the focal regions;
    wherein compressing the video based on the plurality of segments and the focal regions comprises:
    dividing, for a segment of the plurality of segments, frames of the segment into a plurality of frame clusters based on a similarity of the focal regions between the frames of the segment; and
    compressing the segment based on the division of the plurality of frame clusters;
    wherein compressing the segment based on the division of the plurality of frame clusters comprises:
    determining a central frame of a frame cluster of the plurality of frame clusters, wherein the central frame is a frame in the frame cluster that is the closest to the center of the frame cluster; and
    in response to a similarity of the focal regions between the central frame and another frame in the frame cluster satisfying a threshold, removing the other frame from the segment.

2. The method according to claim 1, further comprising:
    removing background regions other than the focal regions from at least a part of frames of the video;
    generating one or more composite background images for the at least a part of frames based on the background regions; and
    saving the one or more composite background images in association with the at least a part of frames from which the background regions have been removed.

3. The method according to claim 2, wherein generating one or more composite background images for the at least a part of frames comprises:
    generating, for a segment of the plurality of segments, a composite background image for the segment based on background regions in frames of the segment other than the focal regions.

4. The method according to claim 1, wherein dividing frames of the segment into a plurality of frame clusters comprises:
    identifying a plurality of phases of the periodic change;
    segmenting, based on the plurality of phases, the segment into a plurality of subsegments corresponding to the plurality of phases; and
    for each subsegment of the plurality of subsegments, dividing, based on a similarity of the focal regions between frames of the subsegment, the frames of the subsegment into a set of frame clusters as a part of the plurality of frame clusters.

5. The method according to claim 1, wherein compressing the video further comprises:
    dividing the plurality of segments into a plurality of segment clusters based on a similarity of the cycle of the periodic change between the plurality of segments; and
    compressing the video based on the division of the plurality of segment clusters.

6. The method according to claim 5, wherein compressing the video based on the division of the plurality of segment clusters comprises:
    determining a central segment of a segment cluster of the plurality of segment clusters, wherein the central segment is a first segment in the segment cluster that is the closest to the center of the segment cluster; and
    for a second segment in the segment cluster:
        in response to a similarity of the focal regions between a frame of the second segment and a corresponding frame of the central segment satisfying a threshold, removing the frame of the second segment from the second segment.

7. An electronic device, comprising:
    a processor; and
    a memory coupled to the processor, wherein the memory has instructions stored therein which, when executed by the processor, cause the electronic device to perform actions comprising:
    segmenting, in response to one or more features of an object in a video having a periodic change, the video into a plurality of segments based on a cycle of the periodic change;
    identifying focal regions in frames of the video that are associated with the object; and
    compressing the video based on the plurality of segments and the focal regions;
    wherein compressing the video based on the plurality of segments and the focal regions comprises:
    dividing, for a segment of the plurality of segments, frames of the segment into a plurality of frame clusters based on a similarity of the focal regions between the frames of the segment; and
    compressing the segment based on the division of the plurality of frame clusters;
    wherein compressing the segment based on the division of the plurality of frame clusters comprises:
    determining a central frame of a frame cluster of the plurality of frame clusters, wherein the central frame is a frame in the frame cluster that is the closest to the center of the frame cluster; and
    in response to a similarity of the focal regions between the central frame and another frame in the frame cluster satisfying a threshold, removing the other frame from the segment.

8. The electronic device according to claim 7, wherein the actions further comprise:
    removing background regions other than the focal regions from at least a part of frames of the video;
    generating one or more composite background images for the at least a part of frames based on the background regions; and
    saving the one or more composite background images in association with the at least a part of frames from which the background regions have been removed.

9. The electronic device according to claim 8, wherein generating one or more composite background images for the at least a part of frames comprises:
    generating, for a segment of the plurality of segments, a composite background image for the segment based on background regions in frames of the segment other than the focal regions.

10. The electronic device according to claim 7, wherein dividing frames of the segment into a plurality of frame clusters comprises:
    identifying a plurality of phases of the periodic change;
    segmenting, based on the plurality of phases, the segment into a plurality of subsegments corresponding to the plurality of phases; and
    for each subsegment of the plurality of subsegments, dividing, based on a similarity of the focal regions between frames of the subsegment, the frames of the subsegment into a set of frame clusters as a part of the plurality of frame clusters.

11. The electronic device according to claim 7, wherein compressing the video further comprises:
    dividing the plurality of segments into a plurality of segment clusters based on a similarity of the cycle of the periodic change between the plurality of segments; and
    compressing the video based on the division of the plurality of segment clusters.

12. The electronic device according to claim 11, wherein compressing the video based on the division of the plurality of segment clusters comprises:
    determining a central segment of a segment cluster of the plurality of segment clusters, wherein the central segment is a first segment in the segment cluster that is the closest to the center of the segment cluster; and
    for a second segment in the segment cluster:
        in response to a similarity of the focal regions between a frame of the second segment and a corresponding frame of the central segment satisfying a threshold, removing the frame of the second segment from the second segment.

13. A computer program product tangibly stored on a non-transitory computer-readable medium and comprising machine-executable instructions, wherein the machine-executable instructions, when executed by a machine, cause the machine to execute a video compression method, the method comprising:
    segmenting, in response to one or more features of an object in a video having a periodic change, the video into a plurality of segments based on a cycle of the periodic change;
    identifying focal regions in frames of the video that are associated with the object; and
    compressing the video based on the plurality of segments and the focal regions;
    wherein compressing the video based on the plurality of segments and the focal regions comprises:
    dividing, for a segment of the plurality of segments, frames of the segment into a plurality of frame clusters based on a similarity of the focal regions between the frames of the segment; and
    compressing the segment based on the division of the plurality of frame clusters;
    wherein compressing the segment based on the division of the plurality of frame clusters comprises:
    determining a central frame of a frame cluster of the plurality of frame clusters, wherein the central frame is a frame in the frame cluster that is the closest to the center of the frame cluster; and
    in response to a similarity of the focal regions between the central frame and another frame in the frame cluster satisfying a threshold, removing the other frame from the segment.

14. The computer program product according to claim 13, further comprising:
    removing background regions other than the focal regions from at least a part of frames of the video;

generating one or more composite background images for the at least a part of frames based on the background regions; and saving the one or more composite background images in association with the at least a part of frames from which the background regions have been removed.

15. The computer program product according to claim 14, wherein generating one or more composite background images for the at least a part of frames comprises:

generating, for a segment of the plurality of segments, a composite background image for the segment based on background regions in frames of the segment other than the focal regions.

16. The computer program product according to claim 13, wherein compressing the video further comprises:

dividing the plurality of segments into a plurality of segment clusters based on a similarity of the cycle of the periodic change between the plurality of segments; and compressing the video based on the division of the plurality of segment clusters.

17. The computer program product according to claim 16, wherein compressing the video based on the division of the plurality of segment clusters comprises:

determining a central segment of a segment cluster of the plurality of segment clusters, wherein the central segment is a first segment in the segment cluster that is the closest to the center of the segment cluster; and for a second segment in the segment cluster:

in response to a similarity of the focal regions between a frame of the second segment and a corresponding frame of the central segment satisfying a threshold, removing the frame of the second segment from the second segment.

18. The computer program product according to claim 13, wherein the one or more features comprise a first object feature that exhibits the periodic change in accordance with the cycle, the first object feature being a particular feature of the object in the video, the cycle being repeated for at least a portion of each of the segments as defined by respective start and end frames thereof within the video.

19. The method according to claim 1, wherein the one or more features comprise a first object feature that exhibits the periodic change in accordance with the cycle, the first object feature being a particular feature of the object in the video, the cycle being repeated for at least a portion of each of the segments as defined by respective start and end frames thereof within the video.

20. The electronic device according to claim 7, wherein the one or more features comprise a first object feature that exhibits the periodic change in accordance with the cycle, the first object feature being a particular feature of the object in the video, the cycle being repeated for at least a portion of each of the segments as defined by respective start and end frames thereof within the video.

* * * * *